Jan. 1, 1924
E. L. WARNER
MOLDED PIPE AND TIE LOCK
Filed April 19, 1922
1,479,120
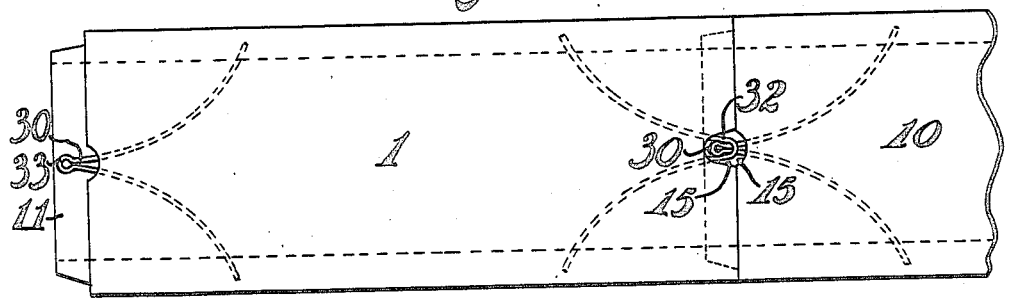
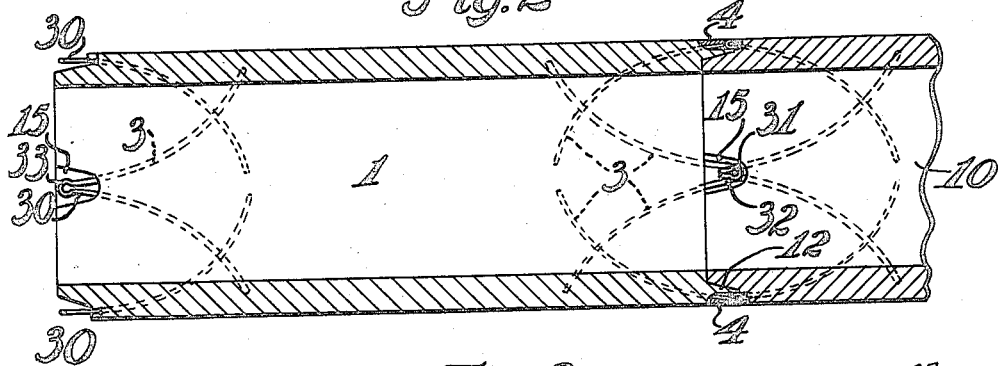
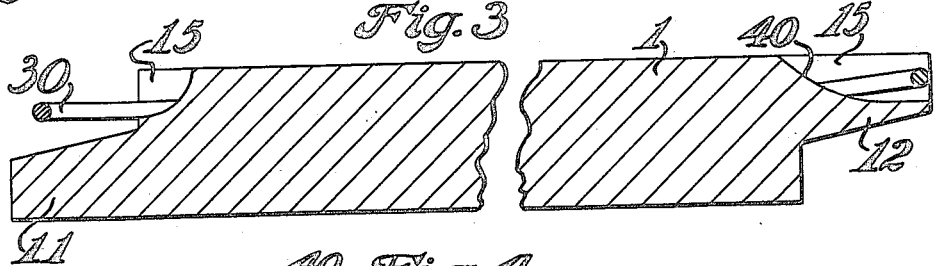
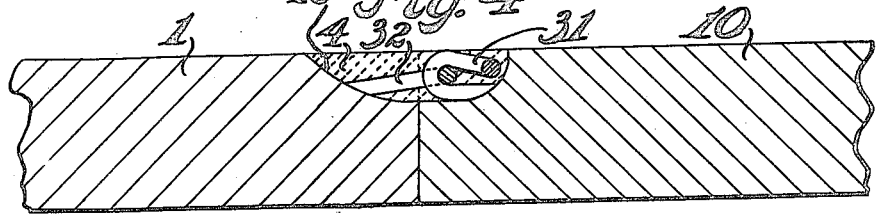
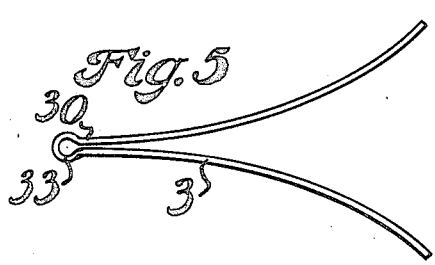
Inventor
Edgar L. Warner
By Reynolds
Attorneys Patented Jan. 1, 1924.

1,479,120

UNITED STATES PATENT OFFICE.

EDGAR L. WARNER, OF SEATTLE, WASHINGTON, ASSIGNOR TO CONCRETE PIPE COMPANY, OF SEATTLE, WASHINGTON, A CORPORATION OF WASHINGTON.

MOLDED PIPE AND TIE LOCK.

Application filed April 19, 1922. Serial No. 555,607.

*To all whom it may concern:*

Be it known that I, EDGAR L. WARNER, a citizen of the United States of America, and resident of the city of Seattle, in the county of King and State of Washington, have invented certain new and useful Improvements in Molded Pipes and Tie Locks, of which the following is a specification.

My invention relates to an improvement in molded pipes and particularly to the manner of reinforcing the pipes and securing the ends of the pipes together to prevent separation.

The object of my invention is to provide means whereby the ends of the molded pipes may be drawn firmly together and secured in this position, and also to so strengthen the joint between a line of pipe composed of sections that it may be given additional strength against lateral deflection of the pipe. One purpose of this is to cause the line of pipe composed of a series of sections to partake somewhat of the character of a beam in its tendencies to resist lateral deflection.

The features of my invention which I believe to be new and upon which I desire to secure a patent will be hereinafter described and then particularly defined by the claims terminating this specification.

The accompanying drawings illustrate typical pipe sections and the manner of constructing them and connecting them together, illustrative of my invention.

Figure 1 is an external view of a couple of sections of pipe, showing my plan for securing the joints together.

Figure 2 is a central longitudinal section taken through two such pipe sections.

Figure 3 is a typical section through a side wall of a pipe, showing the ends thereof and the means by which the ends of successive pipes are secured together.

Figure 4 is a similar section showing a typical joint in its completed form.

Figure 5 shows, separate from the pipe, one of the locking or tie rods.

The type of pipe to which my invention is applicable is typified by a cement or concrete pipe, the same being molded from plastic materials and hardened by later action. While the type of joint herein shown and the manner of locking the ends together might be applicable to pipes made from plastic materials which are hardened by heat, such as clay, it is particularly applicable to pipes in which the hardening or setting of the material is accomplished by chemical action between the parts, such as is typified by the setting action of cement.

The pipe sections may be made either with end projecting flanges which fit one inside the other, as shown in Figures 2 and 3, or square butt ends, as shown in Figure 4. The type of pipe joints employed is largely immaterial.

At each end of the pipe interlocking tie rods are provided, having their ends imbedded in the material of the walls and having a loop section projecting for engagement with a like section which projects from the complemental end of the adjacent pipe section. The imbedded ends may be bent as desired to secure effective anchoring. These strengthening or tie rods 3 are bent upon themselves so as to form a loop as 30, 32, which loop is the projecting portion of the rod. These projecting portions of the tie rods are located inward somewhat from the periphery of the pipe. They are also ordinarily located within recesses as 15, which are formed in the body of the pipe wall. These recesses 15 are preferably somewhat wider than the loops 30 and of sufficient thickness to accommodate the interlocking portions of the tie rods.

At one end of the pipe the loop 32 is preferably made slightly wider than at the other. At its other end it is given a small eye, as 33, capable of receiving the point of a bar which may act as a lever between the two loops to draw the pipe ends together. It is designed so that when the pipes are placed together the looped projecting end of one is to be inserted beneath the loop of the other pipe and then in the finished joint this end is bent upward or outward through the loop of the other pipe and then into the position shown in detail in Figure 4. The end 31 is the one having a sharper bend which brings the two sides of the loop somewhat closer together than is the case in the complemental loop 32.

After the various loops forming the projecting ends of the tie rods have been bent over in the position shown in Figure 4, the recesses 15 are filled with cement mortar or grouting, which in setting will imbed the lock, thus holding all of the parts securely together. This grouting adds to the strength of the lock between the tie rods.

In small sizes of pipe of any length it is necessary that the projecting ends of the tie rods be at the outer periphery of the pipe. Where, however, the pipes are of sufficient diameter to enable the joints to be formed from within the pipe, these projecting ends which are to form the lock may project at the inner side of the pipe.

In Figure 2 the joints which are shown at the upper and lower edge of the figure are at the outside of the pipe, while the joints which are shown on the central line of the pipe are upon the inner side of the pipe. One of the latter would be placed at the lower side of the pipe as laid. This is an advantage particularly in large pipes, as it is difficult to properly make and grout joints formed on the lower side of the pipe if the lock be on the outer side of the pipe, whereas if this lowermost joint be formed at the inner side of the pipe, it is an easy matter to interlock the tie rods and to place the grouting. It is, therefore, my intention to form the lock either at the inner or the outer surface of the pipe as may be convenient, and in fact, in many cases to have both inner and outer formed locks on the same pipe.

The extent of that portion of the tie rods which is imbedded in the walls of the pipe and the direction of their extent will depend upon the desires of the designer and the necessities of the case. Ordinarily I prefer to have these of a material length and to diverge from the point where they enter the pipe wall. In this way they form a short section of helically disposed reinforcement. This gives the lock greater strength in such cases as where the pipe section has had the supporting earth washed away from beneath it. They make of the joint a stronger connection than would be obtained by disposing the reinforcing or tie rods in other positions. This, however, is a matter to be controlled by the desires of the designer and the necessities of the particular case.

While I have illustrated the pipe sections as having nesting end flanges, it is evident that my invention is not dependent upon there being such flanges. The locking tie rods may be used to advantage if the pipe ends merely abut.

To facilitate the bending outward of the looped end 31 I prefer to make the complemental recess of the other pipe into which it is entered, with a curved bottom, as 40, so that the end of the entering loop will be thereby bent upwardly by the act of forcing the pipes together endwise.

What I claim as my invention is:

1. A molded pipe having end projecting flanges adapted for nesting engagement, and also having peripheral recesses at their ends and tie rods imbedded in the walls with portions projecting into said recesses and adapted to interlock with like rods of adjacent assembled pipe sections by passing one through a loop of the other and then bending it over to form an interlocking hook end.

2. A molded pipe having imbedded tie rods provided with loops which project at the ends of the pipe and are adapted one to pass through the other and then to be bent over to thereby interlock adjacent pipe sections, certain of said tie rods projecting without the pipe and others within the pipe, to thereby form both inner and outer locks.

3. A pipe having peripheral recesses at its ends and locking rods projecting into said recesses, the bottom of certain of said recesses being towards their inner ends inclined towards the face of the pipe wall.

4. A locking means for pipe joints comprising locking bars bent to centrally form a loop and having their ends imbedded in the pipe walls with the loops projecting at the ends of the pipe, the complemental loops at opposite ends of the pipe having one its sides separated and the other its sides lying close together with an eye at its end and adapted to pass through its complemental loop and then be bent over the eye of the other loop and form a hook to thereby lock the loops together.

Signed at Seattle, King County, Washington, this 22nd day of March, 1922.

EDGAR L. WARNER.